US009605183B2

(12) United States Patent
Henderson et al.

(10) Patent No.: US 9,605,183 B2
(45) Date of Patent: Mar. 28, 2017

(54) ADHESIVE ARTICLES UTILIZING RELEASE AGENTS FREE OF SILICON AND FLUORINE, AND RELATED METHODS

(71) Applicant: Avery Dennison Corporation, Pasadena, CA (US)

(72) Inventors: Kevin O. Henderson, Willoughby Hills, OH (US); Victor P. Holbert, Newbury, OH (US)

(73) Assignee: Avery Dennison Corporation, Glendale, CA (US)

( * ) Notice: Subject to any disclaimer, the term of this patent is extended or adjusted under 35 U.S.C. 154(b) by 636 days.

(21) Appl. No.: 13/956,923

(22) Filed: Aug. 1, 2013

(65) Prior Publication Data

US 2014/0065334 A1 Mar. 6, 2014

Related U.S. Application Data

(60) Provisional application No. 61/678,319, filed on Aug. 1, 2012, provisional application No. 61/701,743, filed on Sep. 17, 2012.

(51) Int. Cl.
*C09J 7/02* (2006.01)
*B32B 7/12* (2006.01)
(Continued)

(52) U.S. Cl.
CPC ............... *C09J 7/0232* (2013.01); *B32B 1/02* (2013.01); *B32B 1/08* (2013.01); *B32B 7/06* (2013.01);
(Continued)

(58) Field of Classification Search
CPC ............. Y10T 428/2848; Y10T 156/10; Y10T 428/1328; Y10T 428/24802;
(Continued)

(56) References Cited

U.S. PATENT DOCUMENTS 3,671,236 A 6/1972 van Beusekom
4,386,183 A 5/1983 Wempe
(Continued)

FOREIGN PATENT DOCUMENTS

DE 3244120 5/1984
EP 0610008 8/1994
(Continued)

OTHER PUBLICATIONS

International Search Report and Written Opinion issued in corresponding IA No. PCT/US2013/053238 issued Feb. 3, 2014.
(Continued)

*Primary Examiner* — Michael C Miggins
(74) *Attorney, Agent, or Firm* — Avery Dennison Corporation

(57) ABSTRACT

The present subject matter provides an adhesive article having a release agent or liner that is free of silicon-containing and fluorine-containing material, and related methods of adhering a backing material of the adhesive article to a substrate. The adhesive article utilizes an amorphous polyvinyl alcohol layer that facilitates removal of an optional release liner from an adhesive layer. Upon removal of the release liner, the amorphous polyvinyl alcohol layer remains disposed on the adhesive layer. A method of adhering the backing material to a substrate includes dissolving the amorphous polyvinyl alcohol layer and disposing the backing material to a substrate. During dissolution of the amorphous polyvinyl alcohol layer, a weak, temporary bond is formed between the substrate and the backing material. When the amorphous polyvinyl alcohol layer substantially dissolves and dries, the adhesive layer is exposed and forms a permanent bond with the substrate.

38 Claims, 3 Drawing Sheets

(51) Int. Cl.
| | |
|---|---|
| *B32B 27/30* | (2006.01) |
| *B32B 27/32* | (2006.01) |
| *G09F 3/10* | (2006.01) |
| *B32B 1/08* | (2006.01) |
| *B32B 27/06* | (2006.01) |
| *B65B 11/06* | (2006.01) |
| *B65D 75/00* | (2006.01) |
| *G09F 3/04* | (2006.01) |
| *B32B 1/02* | (2006.01) |
| *B32B 38/10* | (2006.01) |
| *B32B 7/06* | (2006.01) |
| *B32B 27/08* | (2006.01) |
| *B32B 27/36* | (2006.01) |
| *B32B 37/12* | (2006.01) |
| *B32B 37/26* | (2006.01) |

(52) U.S. Cl.
CPC .............. *B32B 7/12* (2013.01); *B32B 27/06* (2013.01); *B32B 27/08* (2013.01); *B32B 27/306* (2013.01); *B32B 27/32* (2013.01); *B32B 27/36* (2013.01); *B32B 38/10* (2013.01); *B65B 11/06* (2013.01); *B65D 75/002* (2013.01); *C09J 7/02* (2013.01); *G09F 3/04* (2013.01); *G09F 3/10* (2013.01); *B32B 2037/1276* (2013.01); *B32B 2037/268* (2013.01); *B32B 2255/10* (2013.01); *B32B 2255/26* (2013.01); *B32B 2307/702* (2013.01); *B32B 2307/736* (2013.01); *B32B 2307/748* (2013.01); *B32B 2439/00* (2013.01); *B32B 2439/60* (2013.01); *B32B 2439/70* (2013.01); *C09J 2201/606* (2013.01); *C09J 2203/334* (2013.01); *Y10T 156/10* (2015.01); *Y10T 428/1328* (2015.01); *Y10T 428/1352* (2015.01); *Y10T 428/1452* (2015.01); *Y10T 428/24777* (2015.01); *Y10T 428/24802* (2015.01); *Y10T 428/2848* (2015.01); *Y10T 428/31797* (2015.04); *Y10T 428/31895* (2015.04); *Y10T 428/31938* (2015.04)

(58) Field of Classification Search
CPC ....... Y10T 428/1352; Y10T 428/24777; Y10T 428/31895; Y10T 428/31928; Y10T 428/31797; C09J 7/0232; C09J 7/02; C09J 2203/334; C09J 2201/606; G09F 3/10; G09F 3/04; B32B 7/12; B32B 27/306; B32B 27/32; B32B 1/08; B32B 27/06; B32B 1/02; B32B 38/10; B32B 7/06; B32B 27/08; B32B 27/36; B32B 2255/10; B32B 2255/26; B32B 2307/702; B32B 2307/748; B32B 2439/00; B32B 2439/60; B32B 2439/70; B32B 2037/1276; B32B 2037/268; B65B 11/06; B65D 75/002

See application file for complete search history.

(56) References Cited

U.S. PATENT DOCUMENTS

| | | |
|---|---|---|
| 4,398,985 A | 8/1983 | Eagon |
| 4,440,830 A | 4/1984 | Wempe |
| 6,740,379 B1 | 5/2004 | Congard et al. |
| 7,019,054 B2 | 3/2006 | Dixit et al. |
| 7,828,923 B2 | 11/2010 | Patel et al. |
| 2007/0275201 A1* | 11/2007 | Okawa ............... C09J 7/0278 428/40.1 |
| 2008/0095960 A1 | 4/2008 | Schell et al. |
| 2009/0038736 A1 | 2/2009 | Potter et al. |
| 2012/0034449 A1 | 2/2012 | Imamura et al. |
| 2012/0059092 A1 | 3/2012 | Lux et al. |
| 2012/0061014 A1 | 3/2012 | Patel et al. |

FOREIGN PATENT DOCUMENTS

| | | |
|---|---|---|
| EP | 0816069 | 1/1998 |
| GB | 1047460 | 11/1966 |
| JP | 9031424 | 2/1997 |
| JP | 9111206 | 4/1997 |
| JP | 2002-264264 | 9/2002 |
| WO | 03/016397 | 2/2003 |
| WO | 2007/015264 | 2/2007 |
| WO | 2007/079100 | 7/2007 |
| WO | 2011/139455 | 11/2011 |
| WO | 2013/032932 | 3/2013 |

OTHER PUBLICATIONS

International Preliminary Report on Patentability issued in corresponding IA No. PCT/US2013/053238 issued Feb. 12, 2015.
International Preliminary Report on Patentability issued in corresponding IA No. PCT/US2013/053241 issued Oct. 2, 2013.
International Preliminary Report on Patentability issued in corresponding IA No. PCT/US2013/053241 issued Feb. 12, 2015.

* cited by examiner

ADHESIVE ARTICLES UTILIZING RELEASE AGENTS FREE OF SILICON AND FLUORINE, AND RELATED METHODS

CROSS-REFERENCE TO RELATED APPLICATIONS

The present application claims priority to U.S. Provisional Application Nos. 61/678,319 filed Aug. 1, 2012 and 61/701,743 filed Sep. 17, 2012, both of which are incorporated herein by reference in their entireties.

FIELD

The present subject matter relates to adhesive articles and methods that do not incorporate release liners having silicon-containing or fluorine-containing material. The release liners of the present subject matter and the web matrix from which they are formed can be recycled due to the absence of silicon-containing and fluorine-containing material in their composition.

BACKGROUND

Adhesive products typically have release liners covering an adhesive layer. The release liner protects the adhesive layer from contamination from dirt, moisture, or the like, prior to the adhesive product being applied to a substrate. Typical release liners are paper or polymeric structures that utilize silicon-containing and fluorine-containing materials as a release agent for adhesive articles. The silicon-containing or fluorine-containing component of the release liner contacts the adhesive layer. The silicon-containing or fluorine-containing material allows the release liners to separate easily from the adhesive article when they are needed for use. The silicon-containing or fluorine-containing material does not strongly adhere to the adhesive product and thus provides a releasable interface with the underlying adhesive while providing protection from contamination.

Problems associated with typical release liners coated with silicon-containing and fluorine-containing material are that they are not recyclable due to silicon and fluorine contamination. Such release liners are suitable only for the landfill and contribute significantly to environmental concerns. Furthermore, occasional transfer to the substrate of material containing a silicon or fluorine component can interfere with proper adhesion, cause printing problems for adhesive labels, or other similar difficulties.

Therefore, a need exists for adhesive articles and related methods that do not incorporate a silicon-containing or fluorine-containing material.

SUMMARY

The difficulties and drawbacks associated with previously known release liners and strategies are overcome in the present adhesive articles and related methods.

The present subject matter relates to adhesive articles that do not include silicon-containing or fluorine-containing material. The present subject matter also relates to methods of adhering backing materials to substrates, the methods do not incorporate silicon-containing and fluorine-containing material.

In one aspect, the present subject matter provides an adhesive article comprising a backing material, an adhesive layer disposed on at least a portion of the backing material, a release liner, free of silicon-containing and fluorine-containing material and having a polyvinyl alcohol (hereinafter "PVOH") layer disposed thereon, wherein the PVOH is disposed on at least a portion of the adhesive layer and remains substantially disposed on the adhesive layer upon removal of the release liner.

In another aspect, the present subject matter provides a method of adhering a backing material to a substrate. The method includes providing an adhesive article comprising a backing material, an adhesive layer, a PVOH layer, and a release liner. The method includes separating the release liner from the PVOH layer to expose the PVOH layer. The PVOH layer is dissolved and provides a temporary bond to the substrate and the adhesive layer provides a permanent bond to a substrate.

In still another aspect, the present subject matter provides a method of adhering a backing material to a substrate further comprising the operations of determining if the backing material is misapplied to the substrate and repositioning the backing material on the substrate.

In yet another aspect, the present subject matter provides a container comprising a bottle, a label permanently adhered to the bottle, an adhesive layer disposed between the bottle and the label for permanently adhering the label to the bottle, and polyvinyl alcohol at an interface between the bottle and the label.

In another aspect, the present subject matter provides a method for adhering a backing material to a substrate comprising, providing a backing material with an adhesive layer disposed on at least a portion of the backing material, and a polyvinyl alcohol layer disposed on the adhesive layer, at least partially dissolving the polyvinyl alcohol layer in a manner so that at least a portion of the dissolving polyvinyl alcohol layer remains in contact with the adhesive layer, and forming a temporary and releasable bond to the substrate with the dissolving polyvinyl alcohol layer.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the invention in conjunction with the accompanying drawings.

DETAILED DESCRIPTION OF THE EMBODIMENTS

The subject matter described herein provides an adhesive article with a recyclable release liner free of silicon-containing or fluorine-containing material. The present subject matter also provides methods of adhering backing materials to substrates. The methods provide adhesive articles that comprise a backing material, an adhesive layer disposed on at least a portion of a backing material, and a release liner that that does not contain a silicon-containing or fluorine-containing material, having a PVOH layer disposed thereon. The PVOH layer acts as the release agent for the release liner, and when dissolving acts as a temporary, releasable bond between the backing material and a substrate.

Figure 1:
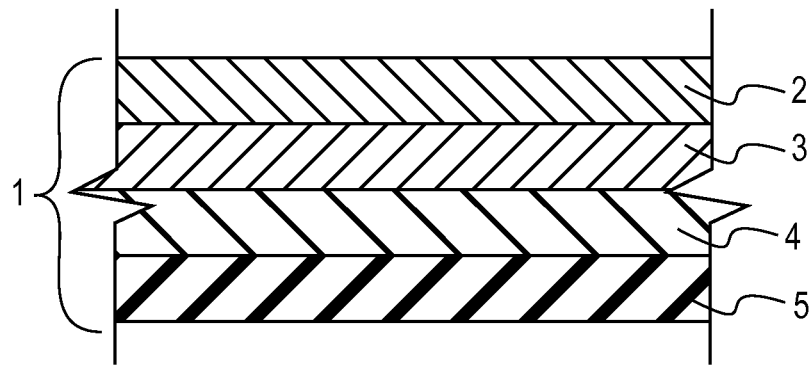
FIG. 1 is a schematic, cross sectional view of a preferred embodiment adhesive article in accordance with the present subject matter.

Referring to FIG. 1, shown is a schematic cross sectional view of a preferred embodiment adhesive article 1 in accordance with the present subject matter. The adhesive article 1 comprises a backing layer 2 (commonly referred to as a "facestock") having an adhesive layer 3 disposed thereon. A release liner 5 has a PVOH layer 4 disposed thereon. The release liner 5 is disposed on at least a portion of the adhesive layer 3 in such a way that the PVOH layer 4 lies between the release liner 5 and the adhesive layer 3.

The adhesive article 1 is such that upon removal of the release liner 5, the PVOH layer 4 remains substantially disposed on at least a portion of the adhesive layer 3. The release liner 5 of the present subject matter is recyclable because it is free from traditional silicon-containing and fluorine-containing release agents. The release liner 5 of the present subject matter utilizes a PVOH layer 4 to act as a releasing agent in place of traditional silicon-containing or fluorine-containing releasing agents.

Figure 4:
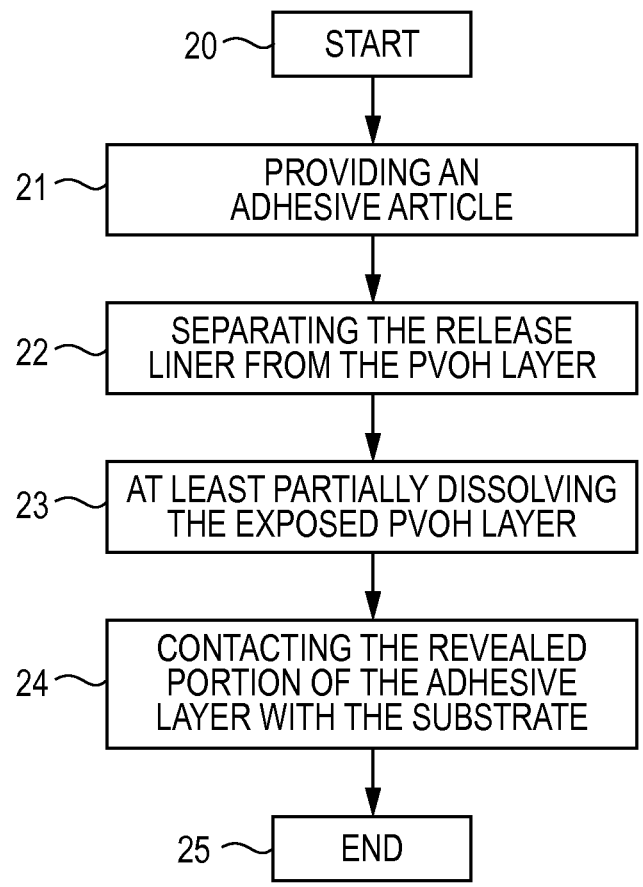
FIG. 4 is a flowchart of an exemplary method for using an adhesive article in accordance with the subject matter.

A related method for adhering a backing material to a substrate is also provided. Referring to FIG. 4, the method 19 provides an adhesive article 21 comprising a backing material; an adhesive layer disposed on at least a portion of the backing material; a release liner, free of silicon-containing and fluorine-containing material and having a polyvinyl alcohol layer disposed thereon, wherein the polyvinyl alcohol layer is in contact with the adhesive layer. The release liner is separated 22 from the PVOH layer to thereby expose the PVOH layer. The exposed PVOH layer is at least partially dissolved 23 to thereby reveal at least a portion of the adhesive layer. The revealed portion of the adhesive layer is contacted 24 with the substrate to adhere the backing material with the substrate. PVOH dissolves in polar solvents. Water is preferably used as the polar solvent to dissolve the exposed PVOH layer and the polar solvent can be applied directly to the exposed PVOH layer or to the substrate. The dissolving PVOH acts as a temporary and relatively weak bond between the backing material and the substrate. During the dissolution process, the backing material can be repositioned on the substrate in an optional additional operation (not shown in FIG. 4). After the PVOH layer has dissolved, the adhesive layer becomes exposed to the substrate and provides a permanent bond with the substrate. Additional details and aspects of the method of FIG. 4 are provided herein.

It is also contemplated that the present subject matter also comprises a method that does not utilize a release liner. The method provides a backing material with an adhesive layer disposed on at least a portion of the backing material, and a polyvinyl alcohol layer disposed on the adhesive layer. The PVOH layer is at least partially dissolved in a manner so that at least a portion of the dissolving PVOH layer remains in contact with the adhesive layer. The method includes forming a temporary and releasable bond to the substrate with the dissolving polyvinyl alcohol layer. The method includes determining if the backing material is misapplied to the substrate, repositioning the backing material on the substrate. The dissolving PVOH layer reveals a portion of the adhesive layer. The method includes forming a permanent bond with the substrate by contacting a revealed portion of the adhesive layer with the substrate.

Another aspect of the present subject matter is a container comprising a bottle, a label permanently adhered to the bottle, an adhesive layer disposed between the bottle and the label for permanently adhering the label to the bottle, and polyvinyl alcohol at an interface between the bottle and the label.

By permanent bond it is meant a bond that is not temporary or releasable. A permanent bond is a bond that is relatively strong and does not provide for repositioning of the backing material on the substrate. Removal of the backing material from the substrate after the permanent bond is established can cause significant structural damage to the backing material and/or the substrate.

For industrial mechanical processing of individual adhesive articles, the backing material can comprise a continuous rolled web layer. A final layered composition is formed by disposing other component layers to the backing material. Once formed, the final layered composition can be die cut to specific dimensions to form individual adhesive layered articles. Typical die cut processes do not utilize 100% of the web material of the final layered composition and a waste component is produced. The advantage of the present subject matter is that silicon-containing and fluorine-containing material are not utilized as part of the release liner or otherwise for the final layered composition. Silicon and fluorine prevent recycling of release liners or backing material. Thus, the release liner or backing material of the present subject matter—whether as part of the waste component or as part of a die cut individual adhesive article—is fully recyclable.

A preferred embodiment of the present subject matter is a pressure-sensitive adhesive label. The label comprises a printable backing material with a pressure-sensitive adhesive ("PSA") layer. A release liner is coated with an amorphous PVOH polymer layer and applied to the PSA layer so that the amorphous PVOH layer is disposed between the PSA layer and the release liner. The present subject matter also includes a linerless adhesive layered composition, in the form of a label or otherwise. The linerless layered composition comprises a backing material with an adhesive layer disposed thereon. A PVOH layer is disposed on the adhesive layer. The PVOH acts as a release agent for the adhesive.

Another preferred embodiment of the present subject matter is a method of adhering a pressure-sensitive adhesive label to a substrate. The pressure-sensitive adhesive label has a backing layer, a PSA layer, and a release liner with an amorphous PVOH polymer layer disposed thereon. The release liner is disposed on the PSA layer such that the amorphous PVOH polymer layer is in contact with the PSA layer. The release liner is removed from the label to thereby expose the amorphous PVOH polymer layer in contact with the PSA layer. A polar solvent, such as water, is brought into contact with the exposed amorphous PVOH polymer layer to dissolve the amorphous PVOH polymer layer. The dissolving amorphous PVOH polymer layer provides an initial, releasable bond between the label and the substrate that provides an opportunity for the label to be repositioned. Once the amorphous PVOH polymer layer is substantially dissolved, the pressure-sensitive adhesive layer thereafter provides a permanent bond between the label and the substrate. These and other aspects are described in greater detail herein as follows.

Adhesive Articles

Adhesive articles in accordance with the present subject matter can be provided in many forms including incorporation for use as a label, a tape, wound dressings, signs, decorations, tile, wall hooks, connection means, sealing elements, surface protection films, graphics materials, and the like. In certain embodiments, adhesive articles of the present subject matter comprise a backing material, an adhesive layer disposed thereon, a release liner with a polyvinyl alcohol layer disposed thereon; wherein the polyvinyl alcohol layer is in contact with the adhesive layer. In a preferred embodiment, the adhesive article has a thickness of from about 30 microns to about 100 microns, and more preferably has a thickness of about 60 microns.

Backing Material

In accordance with the present subject matter, an adhesive article comprises a backing material or facestock. The backing material of an adhesive article can comprise a film, a foil, fabric, paper, or a sheet, all of which are substantially two-dimensional objects. By substantially two-dimensional, it is meant an object having a significantly large size measurement in two dimensions compared to a significantly small size measurement in the third dimension. Alternatively, the backing material can comprise a three-dimensional object, such as an adhesive hook, ornament, tile, or the like. The composition of the backing material, whether two- or three-dimensional, is not particularly limited and can comprise metal, paper, polymers, textiles, glass, ceramic, wood, or combinations thereof.

The backing material of the preferred embodiments is preferably comprised of a thin polymeric elastic or flexible film coating formed from a pliable elastomer material. The film is continuous in that it has no perforations or pores which extend through the thickness of the film. Films of this type are known and are preferably hydrophobic polymeric materials that will not dissolve in water. The backing material preferably has a thickness from about 10 microns to about 60 microns, and more preferably has a thickness of about 40 microns.

The backing material preferably is not dissolved, solubilized, or otherwise damaged by water since the adhesive article of the present subject matter may be exposed to water in order to dissolve the PVOH layer. In the case where the backing material will potentially be damaged by water, a protective treatment or layer can be applied to the backing material to prevent such damage. The backing material may be coated with hydrophobic or water repellent lacquer including, but not limited to poly-vinylidene chloride, acrylates, polyurethane, epoxy resins, silicones, poly-tetrafluoro-ethylene (for example, Teflon, a registered mark of DuPont, USA), poly-vinyl fluoride (for example, Tedlar, a registered mark of DuPont, USA), THV, a polymer of tetrafluoroethylene, hexafluoropropylene and vinylidene fluoride (for example, Dyneon, a registered mark of 3M, USA) etc. The backing material may optionally be coated on either surface.

Adhesive Layer

The adhesive layer of the present subject matter comprises an adhesive for permanently bonding the backing material to a substrate. In one preferred aspect the adhesive layer comprises a pressure-sensitive adhesive.

Pressure-sensitive adhesives are adhesives that bond to a substrate with the application of pressure. Solvents, water, chemical reaction, or heat are not required to activate the adhesive. The degree of bonding strength is influenced by the amount of pressure which is used to apply the adhesive to the surface. Bonding strength is also affected by substrate characteristics such as smoothness, surface energy, presence of contaminants, and the like. Pressure-sensitive adhesives are usually designed for use at room temperature. They normally display a total or partial loss of bonding strength at low temperatures and shear holding ability at high temperatures.

Pressure-sensitive adhesives exhibit viscoelastic properties, which are tailored to ensure proper adhesion. Pressure-sensitive adhesives are designed to balance their tendency to flow (adhesive forces) and their resistance to flow (cohesive forces). Pressure-sensitive adhesives form a bond to a surface because their adhesive forces are such that they flow, or wet the substrate. The bond maintains strength because the cohesive forces of the pressure-sensitive adhesive are such that they resist flow when stress is applied to the bond.

Once the substrate and the pressure-sensitive adhesive are in proximity, there are also molecular interactions, such as van der Waals forces involved in the bond, which contribute significantly to the bond strength.

Pressure-sensitive adhesives are usually composed of elastomeric polymers with or without tackifiers. A variety of polymers have been used to manufacture pressure-sensitive adhesives; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like.

Pressure-sensitive adhesives are typically classified in one of two categories, permanent and removable. Permanent pressure-sensitive adhesives are adhesives which do not allow for the removal of an adhesive article from a substrate without considerable damage to the adhesive article, adhesive failure at the article surface, cohesive failure in the body of the adhesive, or residual transfer of the adhesive to the substrate.

The adhesion of removable pressure-sensitive adhesives is considerably lower, allowing removal of the adhesive article from the substrate even after a protracted period of contact. Removal is accomplished without significant damage to the adhesive article or substrate. Removable pressure-sensitive adhesives form a temporary bond and can be removed without leaving any residue on the substrate.

In accordance with the present subject matter, the adhesive layer may be applied directly or by a carrier to the backing material, and depending upon the utility, can be applied to a backing material or carrier using techniques such as spraying, wire coating, knife coating, Meyer Bar coating, curtain coating, extrusion coating, gravure print coating, or the like.

A preferred embodiment for the adhesive layer of the present subject matter comprises a permanent pressure-sensitive adhesive. The adhesive layer will preferably not chemically react or dissolve the PVOH layer. The adhesive layer can be soluble in aqueous solutions but is preferably not soluble in aqueous solutions. The adhesive layer is preferably an emulsion adhesive comprised of a solvent acrylic polymer.

Other adhesives can be used; such as a polyurethane adhesive, a rubber adhesive, or the like. The adhesive layer should have a glass transition temperature less than about 10° C. below use temperature, typically less than about 30° C. below use temperature. As used herein, the phrase "use temperature" is the temperature at which the adhesive is normally bonded to a substrate. Use temperature is normally ambient (25°) but may be 0° C. or less for low temperature applications and higher than 25° C. for high temperature applications.

The copolymers for the adhesive of the instant subject matter can be stabilized against UV and oxidative degradation by using UV stabilizers and antioxidants. Fillers, colorants, tackifiers, plasticizers, oils, and the like, may also be added.

Upon removal of the release liner, the adhesive layer will preferably retain a substantial portion of the PVOH layer from the release liner. This is due to the bond strength between the PVOH layer and the PSA layer being stronger than the bond strength between the PVOH layer and the release liner. When the PVOH layer is substantially dissolved, the PSA layer provides adhesion between the backing material and the substrate.

The PSA will be applied to a backing material by any practical means, such as spraying, wire coating, dip coating, knife coating, Meyer Bar coating, curtain coating, extrusion coating, gravure print coating, or the like. The PSA will remain affixed to the backing material of an adhesive article even upon exposure to a polar solvent. The adhesive layer preferably has a thickness from about 1 micron to about 10 microns, and more preferably has a thickness of about 8 microns.

The PSA layer can be disposed on a backing material in a fashion suitable for a particular application. For example, the PSA can be disposed over portions of a backing material or over the entire backing material. The coating of PSA disposed on the backing material can be patterned, continuous, or applied as discrete islands of adhesive. The PSA layer can have relative uniform thickness or can vary. In a preferred embodiment, the PSA is disposed in a continuous layer with relative uniform thickness on one entire side of a substantially two-dimensional backing material. In an alternative embodiment, the PSA is disposed on a portion of one side of a substantially two-dimensional backing material.

Regardless of the adhesive chosen for the adhesive layer, it is preferred that the adhesive layer be insoluble in water. To choose an adhesive that could dissolve in water would lead to undesirable consequences. When water is used as the polar solvent and brought into contact with the PVOH layer to dissolve it, a water-soluble adhesive could partially or totally dissolve; leaving a residue on the backing material and preventing optimum adhesion to the substrate. The present subject matter and related embodiments alleviate this problem by incorporating an adhesive that does not readily dissolve in water.

Release Liner

In a preferred embodiment of the present subject matter, the adhesive article has a release liner. The release liner is removed prior to contacting a substrate. The release liner provides protection for the adhesive layer and prevents premature exposure of the adhesive layer to a substrate, and contamination by dirt, liquids, or other elemental exposure. Inadvertent contact or exposure to environmental elements can decrease the tackiness of the adhesive layer and prevent the desired adhesion. The release liner maintains the adhesive tackiness of the adhesive layer.

The release liner also allows for handling of the adhesive article or final layered composition prior to application to a substrate, i.e. during lamination, converting, packaging, handling, and shipping. The release liner may also provide stiffness to the final layered composition to facilitate these steps. Handling of the final layered composition or of the adhesive article can include passing the final layered composition through rollers, die cutting individual adhesive articles from the final layered composition, packaging adhesive articles, printing on adhesive articles, and other manufacturing processes. The release liner may cover all or a portion of the adhesive layer.

Typical liner materials are super calandered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic add; ethylene methyl (meth) acrylate; ethylene butyl acrylate; polypropylene; ethylene/propylene copolymers; and impact resistant ethylene/propylene copolymers and combinations thereof.

In a preferred embodiment, the release liner comprises a polypropylene. The release liner preferably has a thickness from about 5 microns to about 15 microns, and more preferably has a thickness of about 9 microns.

In another aspect of the present subject matter, a backing material does not utilize a release liner. The backing material has an adhesive layer disposed on at least a portion thereof, and a PVOH layer is disposed over the adhesive layer. The PVOH layer is utilized as a release agent for the adhesive layer.

Preferred aspects of the present subject matter includes a PVOH layer. The PVOH layer is either disposed on the release liner or disposed directly on the adhesive layer. Polyvinyl alcohol with chemical formula $(C_2H_4O)_x$ is a water-soluble synthetic polymer. It is resistant to oil, grease, and solvents. PVOH is a solid that is fully degradable and dissolves relatively quickly. It is considered non-toxic. When dry, PVOH is a relatively rigid material that can enhance the dispensing speeds of adhesive articles in a mechanical production process, allowing for more conformability at lower caliper.

When exposed to a polar solvent, such as water, the PVOH layer is dissolved. At the proper thickness on an adhesive article, the dissolving PVOH layer can provide an initial bond between a backing material and a substrate. While not being bound to any theory, it is believed the initial bond is provided by the cohesive forces of the dissolved/dissolving PVOH layer. Where the adhesive layer is solvent-based, the initial adhesion provides tack until the dissolved PVOH layer dries. Where the adhesive layer is water-based, the initial adhesion provides tack until the dissolved PVOH layer is absorbed, dissolves, or otherwise mixes with the adhesive layer.

This initial adhesion is relatively weak when compared to that provided by the adhesive layer. Before the PVOH layer either dries or mixes with the adhesive layer, the weak adhesion allows a backing material to be repositioned on a substrate. This is particularly useful in labeling methods to reclaim mislabeled substrates and to reposition the adhesive label. Once the PVOH is substantially dissolved by the polar solvent—and eventually dries or mixes with the adhesive layer—the underlying adhesive layer is gradually exposed to the substrate to provide a permanent bond between the backing material and the substrate.

In accordance with the present subject matter, a PVOH layer is preferably applied to one side of the release liner. The release liner is disposed on the adhesive layer such that the PVOH layer is disposed between the adhesive layer and the release liner and the PVOH layer is in contact with the adhesive layer.

In another preferred embodiment, the PVOH layer is disposed directly to the adhesive layer and no release liner is utilized. The dry PVOH layer—before exposure to a polar solvent and dissolved—is substantially non-tacky. The dry PVOH layer, without a liner dispose thereon, allows for handling of the layered composition.

In accordance with the present subject matter the PVOH layer preferably comprises an amorphous vinyl-alcohol copolymer resin. Amorphous indicates a condition in which polymer molecules are not crystallized but are randomly structured. Alternatively, the PVOH layer can comprise a crystalline or semi-crystalline PVOH that is partially or fully hydrolyzed, or combinations of a crystalline, semi-crystalline, and amorphous PVOH. An example of a preferred amorphous polyvinyl alcohol polymer is Nichigo G-Polymer provided by Sourus LLC, 3930 Ventura Drive, #355, Arlington Heights, Ill. 60004, USA; a subsidiary of Nippon Gohsei Synthetic Chemical Industry, Osaka Fukoku Seimei Building, 2-4, Komatsubara-cho, Kita-ku, Osaka 530-0018, Japan.

A PVOH layer can be applied to the release liner or directly to the adhesive layer by any conventional means including, lamination, extrusion, deposition, spray coating, dip coating, and the like.

The thickness of the PVOH layer will affect properties of the adhesive article and will determine the amount of polar solvent needed to dissolve the PVOH layer. A thicker PVOH layer requires more polar solvent for dissolution and provides a longer dissolution time, more time before the layer dries, and thus a longer time in which to reclaim a substrate with a misapplied backing material. A thinner layer of PVOH requires less polar solvent for dissolution, provides a shorter dissolution time, a shorter drying time, and thus more quickly exposes the adhesive layer. Furthermore, the PVOH layer may be so thin that when wetted, does not provide enough initial adhesion to a substrate to keep the backing material attached or otherwise may not adequately cover the adhesive layer to allow for repositioning of the backing material. The PVOH layer preferably has a thickness from about 0.1 micron to about 5 microns, and more preferably has a thickness of about 1 micron.

It is contemplated that the PVOH layer is disposed on the entire adhesive layer, or a portion thereof. Preferably, the PVOH layer is disposed on at least a portion of the adhesive layer. Because the PVOH layer displays a very weak bond to the release liner, mechanically produced adhesive articles can be produced at higher dispensing speeds and with less stiffness.

In one aspect of the present subject matter, the release liner is removed from the adhesive article before being placed on a substrate. The PVOH layer will adhere more to the adhesive layer than to the release liner. Thus, the PVOH layer will be left on the adhesive layer upon removal of the release liner. That is, the PVOH layer is transferred from the release liner to the adhesive layer when the release liner is removed from the adhesive article. Thereafter, the PVOH layer is dissolved with a polar solvent.

Optional Layers

The adhesive article of the present subject matter can include other layers for specific intended uses and include printing receptive layers, hydrophobic layers for the backing material, additional backing layers, or the like.

Methods

The preferred methods of the present subject matter provides a release process for an adhesive article that does not utilize a silicon-containing or fluorine-containing material. One method provides a release liner for the adhesive article that is recyclable because no silicon-containing or fluorine-containing materials are used as release agents. Another aspect provides a method that does not utilize a release liner.

Referring to previously described FIG. 4, a preferred method 19 is shown comprising: starting the method, shown as operation 20; providing an adhesive article, shown as operation 21; separating the release liner from the PVOH layer, shown as operation 22; at least partially dissolving the exposed PVOH layer, shown as operation 23; contacting the revealed portion of the adhesive layer with the substrate, shown as operation 24; and ending the method, shown as operation 25. In one aspect, where a release liner is not utilized, operation 22 is not performed.

In operation 21, the adhesive article preferably comprises a backing material, an adhesive layer disposed on at least a portion of the backing material, a release liner, free of silicon-containing and fluorine-containing material and having a polyvinyl alcohol layer disposed thereon, wherein the polyvinyl alcohol layer is in contact with the adhesive layer. In another aspect, a backing material is provided with an adhesive layer disposed thereon. A PVOH layer is disposed directly on the adhesive layer. The backing layer can comprise or make up a portion of a label, tape, wall hook, etc. that is either substantially two-dimensional or is a three-dimensional object. In one aspect the backing material preferably comprises a label that is substantially two-dimensional.

The substrate to which the label is adhered is not particularly limited and can comprise a container, surface, material, human skin, etc. that is flat or contoured, and smooth or rough. A practical consideration for the substrate is the interaction with the adhesive layer. The adhesive layer should provide a sufficient bond to the substrate for a chosen application. The type of substrate will affect the choice of the composition for the adhesive layer and the polar solvent used. In one aspect, the preferred substrate is a bottle.

In operation 22, the release liner is separated from the PVOH layer thereby exposing the PVOH layer that is in contact with the adhesive layer. The PVOH layer has a greater bonding strength with the adhesive layer than with the release liner and therefore, the PVOH layer remains bonded to the adhesive layer upon removal of the release liner. Preferably, a substantial portion of the PVOH layer that is in contact with the adhesive layer will remain in contact with the adhesive layer upon removal of the release liner. More preferably, the entire PVOH layer that is in contact with the adhesive layer will remain bonded to the adhesive layer upon removal of the release liner. Also within the scope of the present subject matter it is contemplated that a small portion of the PVOH layer will remain in contact with the adhesive layer upon removal of the release liner, thereby leaving a larger portion of the PVOH layer removed with the release liner. It is contemplated, that regardless of the relative amount of the PVOH layer remaining in contact with the adhesive layer, there should be an amount adequate to provide an initial bond to the substrate upon dissolution in a polar solvent. When peeled from the adhesive article, the release liner is preferably free of the PVOH layer, and is also free of silicon-containing and fluorine-containing material to allow for recycling of the release liner. In another aspect, the method does not includes the use of a release liner, and thus operation 22 is not performed. The dry PVOH, which is not tacky, acts as a release agent for the adhesive. In this aspect, the PVOH layer can be directly applied to the adhesive layer. The backing material can be rolled or otherwise stacked upon itself before the end use. To expose the PVOH layer, the backing material simply can be unrolled or unstacked.

Also contemplated by the present subject matter is an article and method where the adhesive article is a layered product in a roll. The backing material is also used as the release liner and the PVOH layer is coated on the backing material on the side opposite from the adhesive layer. The PVOH layer will release from the backing material and remain in contact with the adhesive layer upon unwinding the rolled layered product.

Figure 2:
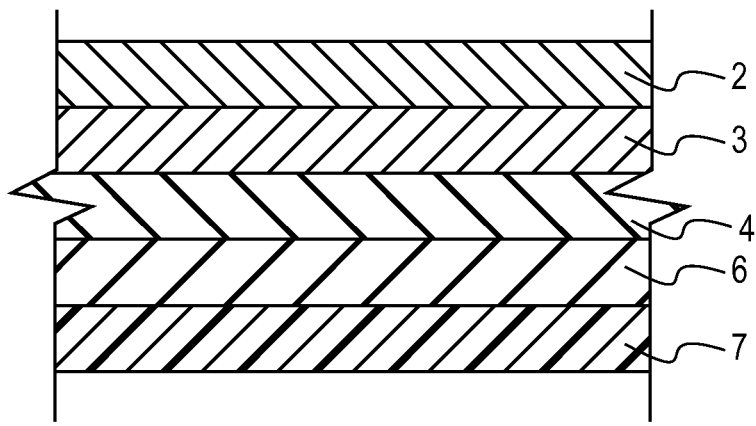
FIG. 2 is a schematic, cross sectional view of a preferred embodiment adhesive article with no release liner, exposed to a polar solvent, and disposed on a substrate.

In operation 23, the PVOH layer is at least partially dissolved by bringing the polar solvent into contact with the exposed PVOH layer that is still in contact with the adhesive layer. As the exposed PVOH layer dissolves in operation 23, at least a portion of the adhesive layer is gradually revealed. Water is preferably used as the polar solvent to dissolve the PVOH layer and the water can be of any type. Preferably liquid water that has been purified by distilling, deionization, or by reverse osmosis is used. A portion of operation 23 is depicted in FIG. 2, showing a schematic, cross sectional view of a preferred embodiment adhesive article with no release liner, exposed to a polar solvent 6, and disposed on a substrate 7. A backing layer 2 has an adhesive layer 3 disposed thereon. The release liner (not shown) has been removed from the adhesive article or was not initially incorporated in accordance with another preferred aspect. The PVOH layer 4 has been exposed to a polar solvent 6 and contacted to a substrate 7. The amount of the polar solvent 6 used in operation 25 is such that the PVOH layer 4 is not washed away from the adhesive layer but is rather wetted so the dissolving PVOH layer 4 can provide an initial bond to the substrate 7. The dissolving PVOH layer 4 that is still disposed on the adhesive layer 3 will preferably substantially dissolve and more preferably, will completely dissolve. It is also within the scope of the present subject matter and contemplated that only a small portion of the PVOH layer 4 that is still disposed on the adhesive layer 3 will be dissolved. Regardless of the proportion of the PVOH layer 4 that is dissolved in operation 25, the adhesive layer 3 should be exposed such that the adhesive layer 3 forms a bond with the substrate 7.

The PVOH layer 4, while it is dissolving and before it dries, provides an initial tack that weakly bonds the backing material 2 to the substrate 7. This weak, initial bond allows for reclaiming of substrates that have a backing material that is out of proper alignment or otherwise misapplied, and allows for repositioning the backing material on the substrate. In a preferred embodiment, the weak, initial bond provided by the dissolving PVOH layer 4 allows for reclaiming of mislabeled substrates to reposition a label correctly on the substrate. When the PVOH layer 4, that is still disposed on the adhesive layer 3, is substantially dissolved and begins to dry, the adhesive layer 3 will be gradually exposed and can form a secondary, permanent bond with the substrate 7.

Figure 3:
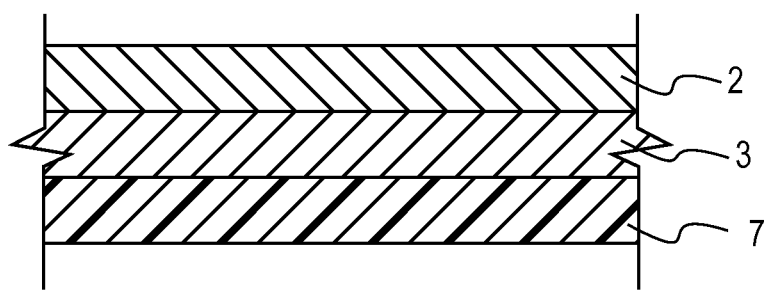
FIG. 3 is a schematic, cross sectional view of a preferred embodiment backing material permanently bonded to a substrate with an adhesive layer.

In operation 24, the revealed portion of the adhesive layer is contacted with the substrate. This situation is depicted in FIG. 3, showing a schematic, cross sectional view of a preferred embodiment backing material 2 permanently bonded to a substrate 7. In FIG. 3, the PVOH layer is substantially dissolved and dried, and thus not depicted, thereby allowing the adhesive layer 3 to form a permanent bond with the substrate 7. While not being bound to any particular theory, it is believed that the dissolved and subsequently dried PVOH layer forms small colloid particles at the interface, that leave enough functionality in the adhesive layer to form a permanent bond with the substrate. In water-based adhesive, the dissolved PVOH layer may be absorbed by the adhesive.

Operation 24 can be combined with, or performed simultaneously with, operation 23. For example, the polar solvent can be brought into contact with the exposed PVOH layer by applying the polar solvent to the substrate and bringing the exposed PVOH layer in contact with the wetted substrate. The polar solvent on the substrate will dissolve the exposed PVOH layer, thereby exposing the adhesive layer so the adhesive layer can form a permanent bond with the substrate. Thus, operations 23 and 24 can be initiated simultaneously. Alternatively, the polar solvent can be brought into contact with the PVOH layer by applying the polar solvent directly to the exposed PVOH layer, rather than to the substrate. In either embodiment, the polar solvent can be applied to the substrate or to the PVOH layer by any conventional means such as spraying, rolling, painting, dipping, microencapsulation, and the like. In microencapsulation techniques, the polar solvent is disposed in tiny microcapsules. The mircrocasules release the polar solvent upon an external trigger such as pressure, heat, UV radiation, or the like. The microcapsules can be integrated into or on the adhesive layer, the PVOH layer, or by other means so that the polar solvent, once released from the microcapsules, will dissolve the PVOH layer to provide a temporary, weak, releasable bond. In a preferred embodiment, the polar solvent is sprayed onto a portion of the substrate.

In preferred embodiments, the wetted portion of the substrate does not have to be entirely covered by the backing material; and conversely, the entire portion of the substrate covered by the backing material does not have to be wetted. As the exposed PVOH layer is dissolved by the polar solvent, the adhesive layer should increasingly become exposed to the substrate. The interface between the adhesive layer and the substrate will increase in size as the PVOH layer dissolves. The adhesive layer will then form a stronger, secondary bond with the substrate. In one aspect, the adhesive layer preferably forms a permanent bond with the substrate.

Other additional operations can be incorporated into the method including heating, cooling, and/or repositioning operations. A heating operation can increase the rate at which the exposed PVOH layer dissolves in a polar solvent. A cooling operation can decrease the rate at which the exposed PVOH layer dissolves in a polar solvent. A repositioning operation can be used to reclaimed substrates with misaligned backing materials and to properly align the backing materials to the substrates.

The operations of the methods can be tailored for each individual scenario and can be carried out by machine such as by a mechanized labeling machine, or can be carried out by hand utilizing individual adhesive articles.

Substrates

In accordance with the present subject matter, an adhesive article or backing material is adhered to a substrate. The substrate is not particularly limited. Various substrates are contemplated by the present subject matter and can include any substrate to which an adhesive article is to be adhered. The present subject matter provides an adhesive article that can be repositioned on a substrate if initially misapplied. In one aspect a container is provided that incorporates a label. The preferred container comprises a bottle with a label that has an adhesive layer for permanently adhering the label to the bottle. Amorphous PVOH is at an interface between the bottle and the label. The amorphous PVOH is either in dry form or mixed with the adhesive layer. The label was bonded to the bottle by any of the preferred methods discussed herein. Such methods are fully incorporated herein.

The amorphous PVOH layer on the label has been dissolved. The dissolving amorphous PVOH layer will provide a temporary, releasable bond between the backing layer and the bottle. While not being bound to any particular theory, it is believed that if the adhesive layer is water based, the dissolved amorphous PVOH layer will mix with the adhesive layer and expose the adhesive layer. The dissolved amorphous PVOH layer will preferably not substantially effect the bonding force of the adhesive layer. If the adhesive layer is solvent based, it is believed that the dissolved amorphous PVOH will eventually dry out and remain at the bottle-label interface but will provided sufficient contact between the bottle and the adhesive layer to form a permanent bond.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. An adhesive article comprising:
   a backing material;
   an adhesive layer disposed on at least a portion of the backing material;
   a release liner, free of silicon-containing and fluorine-containing material, and having a polyvinyl alcohol layer disposed thereon, and
   wherein the polyvinyl alcohol layer is disposed on at least a portion of the adhesive layer and remains substantially disposed on said at least a portion of the adhesive layer upon removal of the release liner from the adhesive article,
   wherein the polyvinyl alcohol layer comprises an amorphous polyvinyl alcohol polymer.

2. The adhesive article of claim 1 wherein the adhesive article has a thickness of from 30 microns to 100 microns, the backing material has a thickness of from 10 microns to 60 microns, the adhesive layer has a thickness of from 1 micron to 10 microns, the polyvinyl alcohol layer has a thickness of from 0.1 micron to 5 microns, and the release liner has a thickness of from 5 microns to 15 microns.

3. The adhesive article of claim 1 wherein the backing material is selected from the group consisting of paper, a polymeric film, foil, woven cloth, nonwoven cloth, fiberglass, and combinations thereof.

4. The adhesive article of claim 1 wherein the adhesive layer comprises an emulsion-acrylic adhesive.

5. The adhesive article of claim 1 wherein the backing material comprises a label.

6. The adhesive article of claim 1 wherein the release liner is selected from the group consisting of paper, a polymeric film, and combinations thereof.

7. The adhesive article of claim 6 wherein the release liner comprises polyethylene terephthalate.

8. A method for adhering a backing material to a substrate comprising:
   providing an adhesive article comprising a backing material, an adhesive layer disposed on at least a portion of the backing material, a release liner free of silicon-containing and fluorine-containing material and having a polyvinyl alcohol layer disposed thereon, wherein the polyvinyl alcohol layer is in contact with the adhesive layer;
   separating the release liner from the polyvinyl alcohol layer to thereby expose the polyvinyl alcohol layer;
   at least partially dissolving the polyvinyl alcohol layer in a manner so that at least a portion of the dissolving polyvinyl alcohol layer remains in contact with the adhesive layer; and
   forming a temporary and releasable bond to the substrate with the dissolving polyvinyl alcohol layer,
   wherein the polyvinyl alcohol layer comprises an amorphous polyvinyl alcohol polymer.

9. The method of claim 8 wherein at least partially dissolving the exposed polyvinyl alcohol layer thereby reveals at least a portion of the adhesive layer, the method further comprising contacting the revealed portion of the adhesive layer with the substrate to thereby adhere the backing material to the substrate.

10. The method of claim 9 wherein the revealed portion of the adhesive layer permanently adheres the backing material to the substrate.

11. The method of claim 9 wherein the adhesive article has a thickness of from 30 microns to 100 microns, the backing material has a thickness of from 10 microns to 60 microns, the adhesive layer has a thickness of from 1 micron to 10 microns, the polyvinyl alcohol layer has a thickness of from 0.1 micron to 5 microns, and the release liner has a thickness of from 5 microns to 15 microns.

12. The method of claim 9 wherein the backing material is selected from the group consisting of paper, a polymeric film, foil, woven cloth, nonwoven cloth, fiberglass, and combinations thereof.

13. The method of claim 9 wherein the adhesive layer comprises an emulsion-acrylic adhesive.

14. The method of claim 13 wherein the release liner comprises polyethylene terephthalate.

15. The method of claim 9 wherein the release liner is selected from the group consisting of paper, a polymeric film, and combinations thereof.

16. The method of claim 9 wherein the backing material comprises a label and the substrate comprises a bottle.

17. The method of claim 9 further including
    determining if the backing material is misapplied to the substrate; and
    repositioning the backing material on the substrate.

18. The method of claim 8 wherein at least partially dissolving is performed by bringing a polar solvent into contact with the exposed polyvinyl alcohol layer.

19. The method of claim 18 wherein bringing the polar solvent into contact with the exposed polyvinyl alcohol layer is performed by applying the polar solvent directly to the exposed polyvinyl alcohol layer.

20. The method of claim 19 wherein the polar solvent is water and applying is performed by spray coating, roll coating, dip coating, painting, printing, spin coating, or vapor coating.

21. The method of claim 18 wherein bringing the polar solvent into contact with the exposed polyvinyl alcohol layer is performed by applying the polar solvent to the substrate and contacting the exposed polyvinyl alcohol layer to the polar solvent on the substrate.

22. The method of claim 21 wherein the polar solvent is water and applying is performed by spray coating, roll coating, dip coating, painting, printing, spin coating, or vapor coating.

23. A container comprising:
a bottle;
a label permanently adhered to the bottle;
an adhesive layer disposed between the bottle and the label for permanently adhering the label to the bottle; and wherein an amorphous polyvinyl alcohol is disposed on at least a portion of the adhesive layer at an interface between the bottle and the label.

24. The container of claim 23 wherein the amorphous polyvinyl alcohol is in a dry form.

25. The container of claim 23 wherein the amorphous polyvinyl alcohol is dissolved and mixed with the adhesive layer.

26. A method for adhering a backing material to a substrate comprising:
providing a backing material with an adhesive layer disposed on at least a portion of the backing material, and a polyvinyl alcohol layer disposed on the adhesive layer;
at least partially dissolving the polyvinyl alcohol layer in a manner so that at least a portion of the dissolving polyvinyl alcohol layer remains in contact with the adhesive layer; and
forming a temporary and releasable bond to the substrate with the dissolving polyvinyl alcohol layer,
wherein the polyvinyl alcohol layer comprises an amorphous polyvinyl alcohol polymer.

27. The method of claim 26 wherein at least partially dissolving the exposed polyvinyl alcohol layer thereby reveals at least a portion of the adhesive layer, the method further comprising contacting the revealed portion of the adhesive layer with the substrate to thereby adhere the backing material to the substrate.

28. The method of claim 27 wherein the revealed portion of the adhesive layer permanently adheres the backing material to the substrate.

29. The method of claim 27 wherein the adhesive article has a thickness of from 30 microns to 100 microns, the backing material has a thickness of from 10 microns to 60 microns, the adhesive layer has a thickness of from 1 micron to 10 microns, the polyvinyl alcohol layer has a thickness of from 0.1 micron to 5 microns, and the release liner has a thickness of from 5 microns to 15 microns.

30. The method of claim 27 wherein the backing material is selected from the group consisting of paper, a polymeric film, foil, woven cloth, nonwoven cloth, fiberglass, and combinations thereof.

31. The method of claim 27 wherein the adhesive layer comprises an emulsion-acrylic adhesive.

32. The method of claim 27 wherein the backing material comprises a label and the substrate comprises a bottle.

33. The method of claim 27 further comprising,
determining if the backing material is misapplied to the substrate, and
repositioning the backing material on the substrate;
wherein the forming and contacting operations are performed sequentially and the determining and repositioning operations are performed after the forming operation and before the contacting operation.

34. The method of claim 26 wherein at least partially dissolving is performed by bringing a polar solvent into contact with the exposed polyvinyl alcohol layer.

35. The method of claim 34 wherein bringing the polar solvent into contact with the exposed polyvinyl alcohol layer is performed by applying the polar solvent directly to the exposed polyvinyl alcohol layer.

36. The method of claim 35 wherein the polar solvent is water and applying is performed by spray coating, roll coating, dip coating, painting, printing, spin coating, micro encapsulation, or vapor coating.

37. The method of claim 34 wherein bringing the polar solvent into contact with the exposed polyvinyl alcohol layer is performed by applying the polar solvent to the substrate and contacting the exposed polyvinyl alcohol layer to the polar solvent on the substrate.

38. The method of claim 37 wherein the polar solvent is water and applying is performed by spray coating, roll coating, dip coating, painting, printing, spin coating, micro encapsulation, or vapor coating.

* * * * *